(12) United States Patent
Marappan

(10) Patent No.: US 6,783,060 B2
(45) Date of Patent: Aug. 31, 2004

(54) SMART BUSINESS CARD SYSTEM

(75) Inventor: Kumar Marappan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 10/139,267

(22) Filed: May 2, 2002

(65) Prior Publication Data

US 2003/0205615 A1 Nov. 6, 2003

(51) Int. Cl.[7] .............................................. G06F 17/00
(52) U.S. Cl. ....................... 235/375; 235/380; 235/382
(58) Field of Search ................................ 235/375, 380, 235/382, 449, 445; 701/208, 211; 707/201

(56) References Cited

U.S. PATENT DOCUMENTS

| | | | |
|---|---|---|---|
| 5,493,105 A | 2/1996 | Desai | 235/375 |
| 5,818,442 A | 10/1998 | Adamson | 345/330 |
| 6,058,402 A | 5/2000 | Feiken | 708/144 |
| 6,108,789 A * | 8/2000 | Dancs et al. | 713/201 |
| 6,141,752 A | 10/2000 | Dancs et al. | 713/172 |
| 6,293,462 B1 | 9/2001 | Gangi | 235/380 |

OTHER PUBLICATIONS

Uchida et al, Navigation system, Aug. 9, 2001, U.S. patent application Publication. Kusama, Data storage method and device and storage therefor, May 9, 2002, U.S. Patent application Publication.*
Parent, Architecture for communicating with one or more electronic devices through a gateway computer, Aug. 1, 2002. Mandler et al, Use of special directories for encoding semantic information in a file system, Jul. 25, 2002.*
Arteaga et al, System and method for remote communication transactions, Oct. 31, 2002, U.S. patent application Publication. Taylor, Provision of services via an information technology network, Oct. 3, 2002, U.S. patent application Publication.*
Goiffon et al, Object management system supporting the use of application domain knowledge mapped to technology domain knowledge, May 1, 2001, U.S. patent application Publication.*

* cited by examiner

*Primary Examiner*—Michael G. Lee
*Assistant Examiner*—Kimberly D. Nguyen
(74) *Attorney, Agent, or Firm*—David A. Mims, Jr.; Rudolf O. Siegesmund

(57) ABSTRACT

A business card that contains printed textual information on the first side and magnetic media for storing electronic information on a second side. The second side contains all of the printed information displayed on the first side of the document. The business card also allows users to include additional information on the second side such as attached files and hyperlinks. To write and read to and from the business card, a reader/writer is disclosed. The reader/writer interfaces to a desktop computer. A software program in the personal computer enables reading and writing data to and from the business card. Because the data to be read is in XML format, any application capable of handling data in XML format will be able to process the information scanned from the card.

38 Claims, 10 Drawing Sheets

```
<xs:schema xmlns:xs="http://www.w3.org/2000/10/XMLSchema">

<xs:annotation>
  <xs:documentation>
    Default Business Card Content Descriptor for the electronic business card.
  </xs:documentation>
</xs:annotation>

<xs:element name="businesscard" type="businesscardType"/>

<xs:complexType name="businesscardType">
  <xs:sequence>
    <xs:element name="name" type="xs:string" minOccurs="1" maxOccurs="1"/>
    <xs:element name="jobtitle" type="xs:string" minOccurs="1" maxOccurs="1"/>
    <xs:element name="company" type="xs:string" minOccurs="0" maxOccurs="1"/>
    <xs:element name="worktelephone" type="xs:string" minOccurs="0" maxOccurs="unbounded"/>
    <xs:element name="workaddress" type="xs:string" minOccurs="0" maxOccurs="unbounded"/>
    <xs:element name="emailaddress" type="xs:string" minOccurs="0" maxOccurs="unbounded"/>
    <xs:element name="hometelephone" type="xs:string" minOccurs="0" maxOccurs="unbounded"/>
    <xs:element name="mobilenumber" type="xs:string" minOccurs="0" maxOccurs="unbounded"/>
    <xs:element name="pager" type="xs:string" minOccurs="0" maxOccurs="1"/>
  </xs:sequence>
</xs:complexType>

</xs:schema>
```

FIG. 6

```
<xs:schema xmlns:xs="http://www.w3.org/2000/10/XMLSchema">
  <xs:annotation>
    <xs:documentation>
      Default Business Card Content Descriptor for the electronic business card
    </xs:documentation>
  </xs:annotation>

<xs:element name="businesscard" type="businesscardType"/>

<xs:complexType name="businesscardType">
    <xs:sequence>
      <xs:element name="name" type="xs:string" minOccurs="1" maxOccurs="1"/>
      <xs:element name="jobtitle" type="xs:string" minOccurs="1" maxOccurs="1"/>
      <xs:element name="company" type="xs:string" minOccurs="0" maxOccurs="unbounded"/>
      <xs:element name="worktelephone" type="xs:string" minOccurs="0" maxOccurs="unbounded"/>
      <xs:element name="workaddress" type="xs:string" minOccurs="0" maxOccurs="unbounded"/>
      <xs:element name="emailaddress" type="xs:string" minOccurs="0" maxOccurs="unbounded"/>
      <xs:element name="hometelephone" type="xs:string" minOccurs="0" maxOccurs="unbounded"/>
      <xs:element name="mobilenumber" type="xs:string" minOccurs="0" maxOccurs="unbounded"/>
      <xs:element name="pager" type="xs:string" minOccurs="0" maxOccurs="1"/>
      <xs:element name="alternatephone" type="xs:string" minOccurs="0" maxOccurs="1"/>     ~810
      <xs:element name="alternateaddress" type="xs:string" minOccurs="0" maxOccurs="1"/>   ~820
    </xs:sequence>
  </xs:complexType>
</xs:schema>
```
~800

FIG. 8

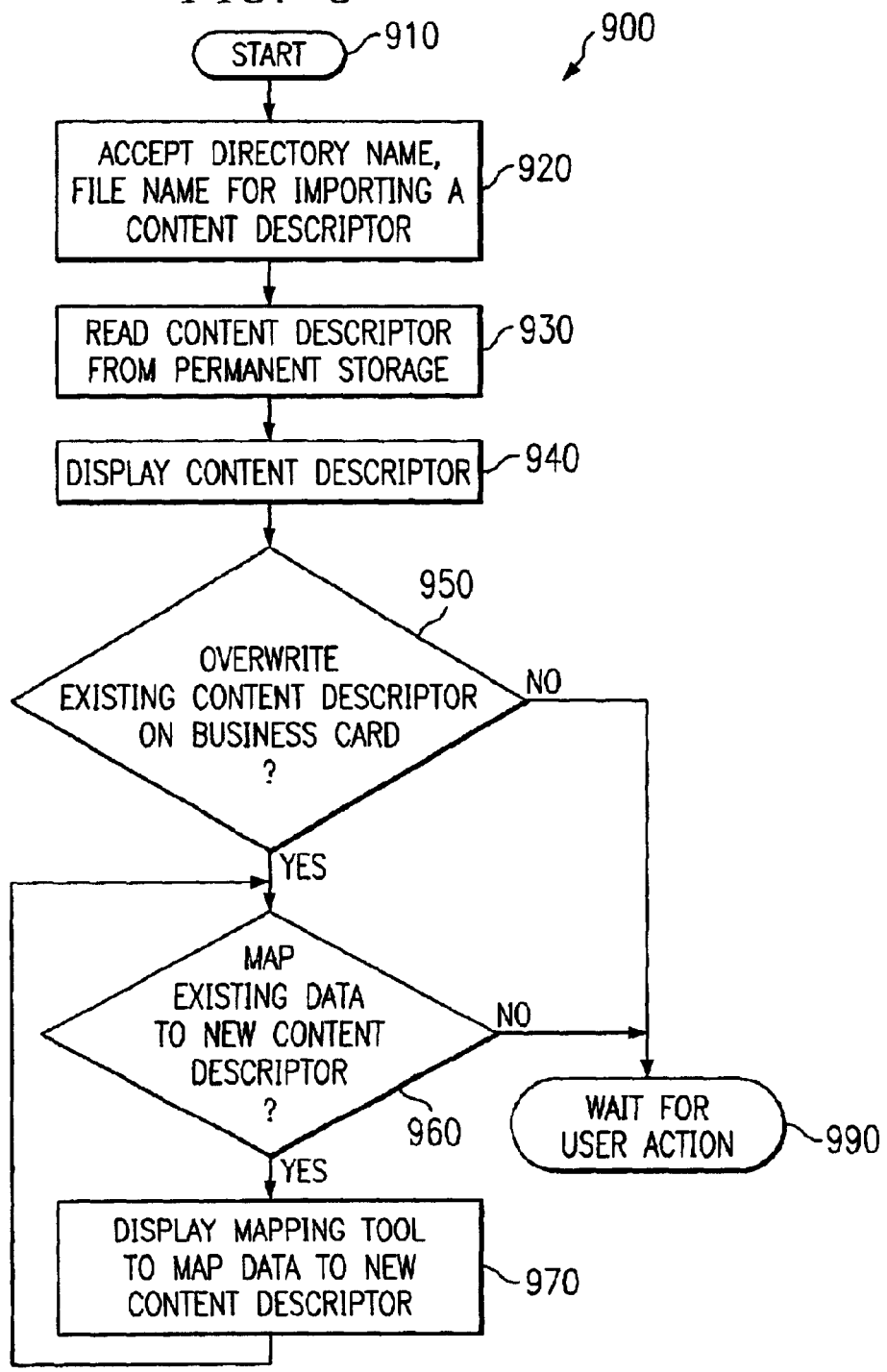

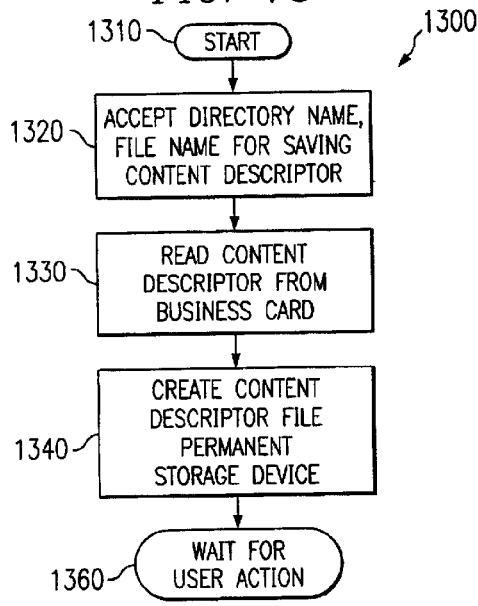
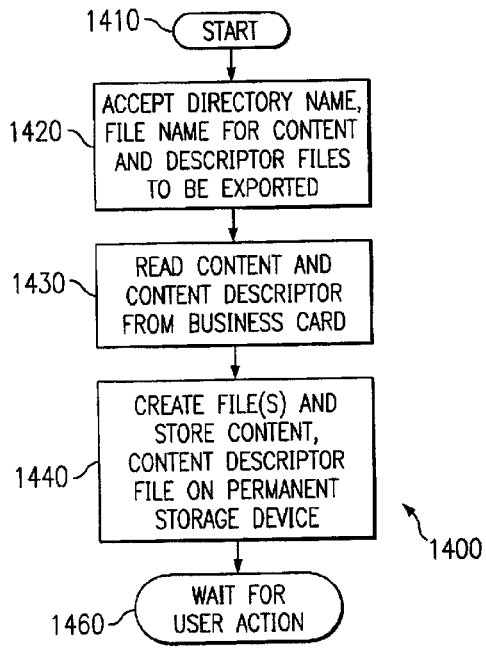
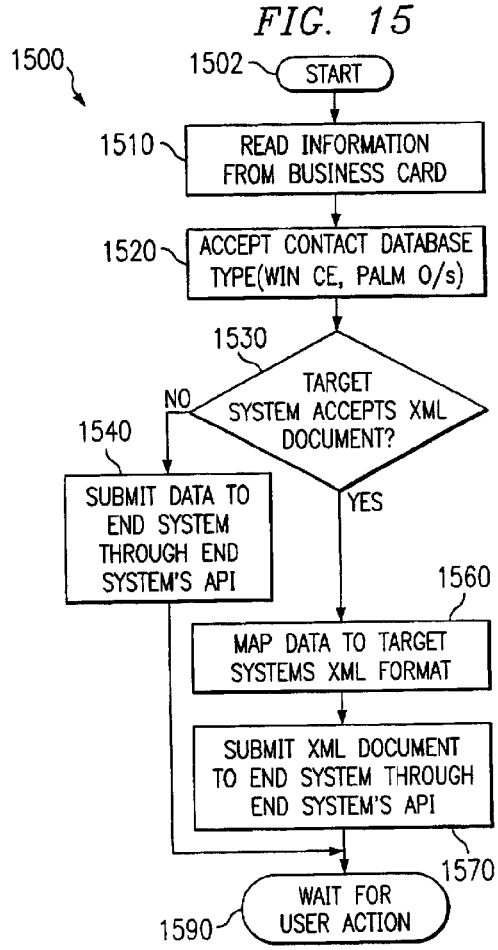

SMART BUSINESS CARD SYSTEM

FIELD OF THE INVENTION

The present invention relates to the field of data storage, retrieval and organization. More specifically, the present invention involves a business card with magnetic storage media, a card reader and software to allow universal use of the business card.

BACKGROUND OF THE INVENTION

Business cards contain textual information. To get the information from the business card into electronic format so that it can be entered into a personal computer or handheld device, the information must be manually typed into the personal computer or the handheld device. Manual typing is time consuming and error prone. Additionally, a typical business card contains very little information compared to what could be stored in the card electronically. Therefore, a need exists for a business card that can contain information stored electronically and that can transmit the electronically stored data to a personal computer or a handheld device.

"Smart cards" exist in banking and finance and the term has been used for credit cards that contain an integrated circuit so that the credit card has some memory and also the ability to perform certain operations.

Cards may have one or more magnetic stripes on one side for storing and transmitting data. U.S. Pat. No. 5,493,105 (the '105 patent) discloses an electronic business card system with a business card having computer readable data stored on computer readable storage media. The '105 patent further discloses a card reader coupled to a computer control system so that card data can be organized and manipulated. Specifically the '105 patent discloses "an electronic business card having first and second sides" where the first side has "computer readable storage media" for the storing of business card data, and the second side has "a printed text representation of the business card data for visual representation." (Col. 2 lines 58–62). In one embodiment of the '105 patent, "organizational parameters are selected from a group consisting of a name, a business name, a specialty, an address, a telephone number, an area code, and a zip code." (Col. 3 lines 10–14). The '105 patent discloses a magnetic strip card reader and states that "[o]ther types of card readers are also envisioned such as optical, memory cards and others."

Another type of device to enhance the use of business is card scanning software that allows business cards with wide varieties of text and designs to have information scanned by means of large data banks to match words on the cards. One example of such card scanning software is CardScan by Corex Technologies. The CardScan system can be integrated with full featured address books and synchronized with Outlook® and Palm™.

Several needs exist to further exploit the capabilities of business cards by using them in conjunction with computers, the Internet and handheld personal computing devices. The first need is to expand the amount of data that can be held on a business card so that not only basic information may be stored and transmitted but brochures, business plans, spreadsheets, proposals, and almost any document a business person might want to hand over to a business contact. Existing electronic business cards display up to approximately 100 characters due to the size of the magnetic strip. What is needed is an electronic business card with a much larger storage capacity.

A second need is to provide a format where the data stored on the card can be universally read, retrieved, sent, and received between users of the card and the card reader system. Specifically, a need exists for a card in which data can be stored in Extensible Markup Language (XML) format so that most available software can readily process the information. XML is a condensed form of Standard Generalized Markup Language (SGML) and allows software developers for Internet applications greater flexibility than the Hypertext Markup Language (HTML) when organizing and presenting information.

A third need is for a secure way to transmit personal messages by writing data to a business card that can be given to a recipient for later use. In order to accomplish this goal, a card reading device must also be able to write to the card. Preferably the card reading device would be a hand held device or a device which attaches to an existing hand held personal computing device.

SUMMARY OF THE INVENTION

The "Smart Business Card" (SBC) is a business card that contains printed textual information on the first side and that has a second side of magnetic media for storing electronic information. The second side contains all of the printed information displayed on the first side of the document and also any additional information the user desires to communicate to recipients of the SBC. Examples of additional information are company profile, company project experience of the person owning the business card, information about any deals, commitments, meeting notices, and reminders to the recipient of the card. The information on the second side is written on the magnetic media in XML format.

To write and read to and from the SBC a special device called the Smart Business Card-Read/Write (SBCR/W) is provided. The SBCR/W has interfaces to desktop computers via the USB port or the serial port, and to handheld devices via the USB/Serial Cradle or the infrared port. A Smart Business Card Program (SBCP) in the personal computer or handheld device enables reading and writing data to and from the SBC through the SBCR/W.

The SBCP is XML enabled so that it will understand the data read from the device. The SBCP may be provided with software to interface with other contact databases such as Linux, Palm OS contact DB, and Win CE Contact DB. During installation, the SBCP queries the user about the contact database that will be used. Based on the user selection, the appropriate contact database adapter will be installed and the data will be transferred to the appropriate fields to the contact database. Writing data to the card can also be accomplished using the software provided. Because the data to be read is in XML format, any application capable of handling data in XML format will be able to process the information scanned from the card.

BRIEF DESCRIPTION OF THE DRAWINGS

FIG. 6 depicts an exemplary Default Business Card Content Descriptor;

FIG. 8 depicts a flowchart for the Import of Business Card Content Descriptor routine;

FIG. 9 depicts a modified Business Card Content Descriptor;

FIG. 13 depicts a flowchart for the Export of Business Card Content with Content descriptor Routine;

FIG. 14 depicts a flowchart of the Import of Business Card Content with Content Descriptor routine; and FIG. 15 depicts a flowchart of the Updating routine.

DETAILED DESCRIPTION OF THE PREFERRED EMBODIMENT

Figure 1:
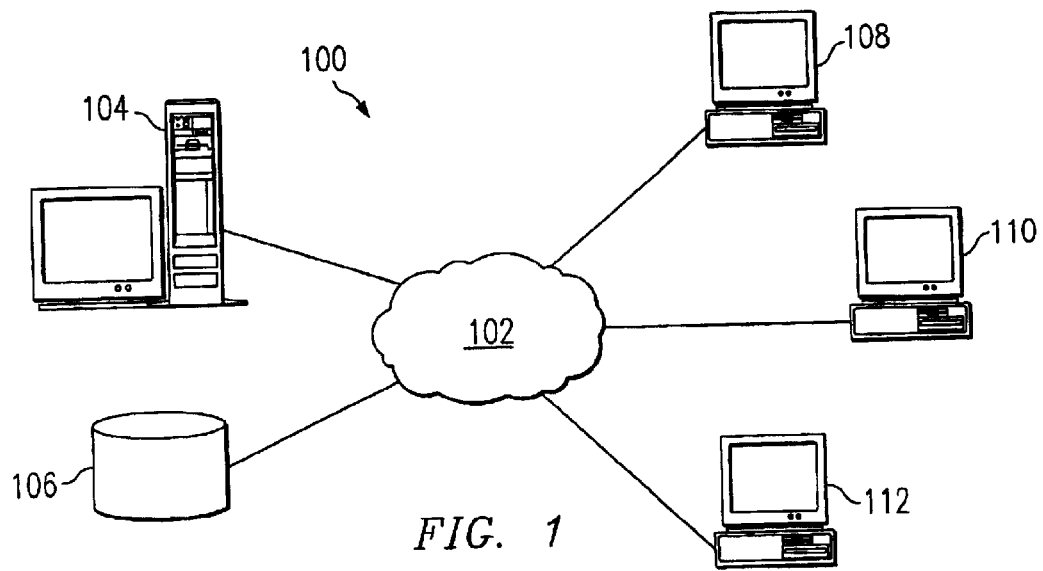
FIG. 1 is an illustration of a distributed data network.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
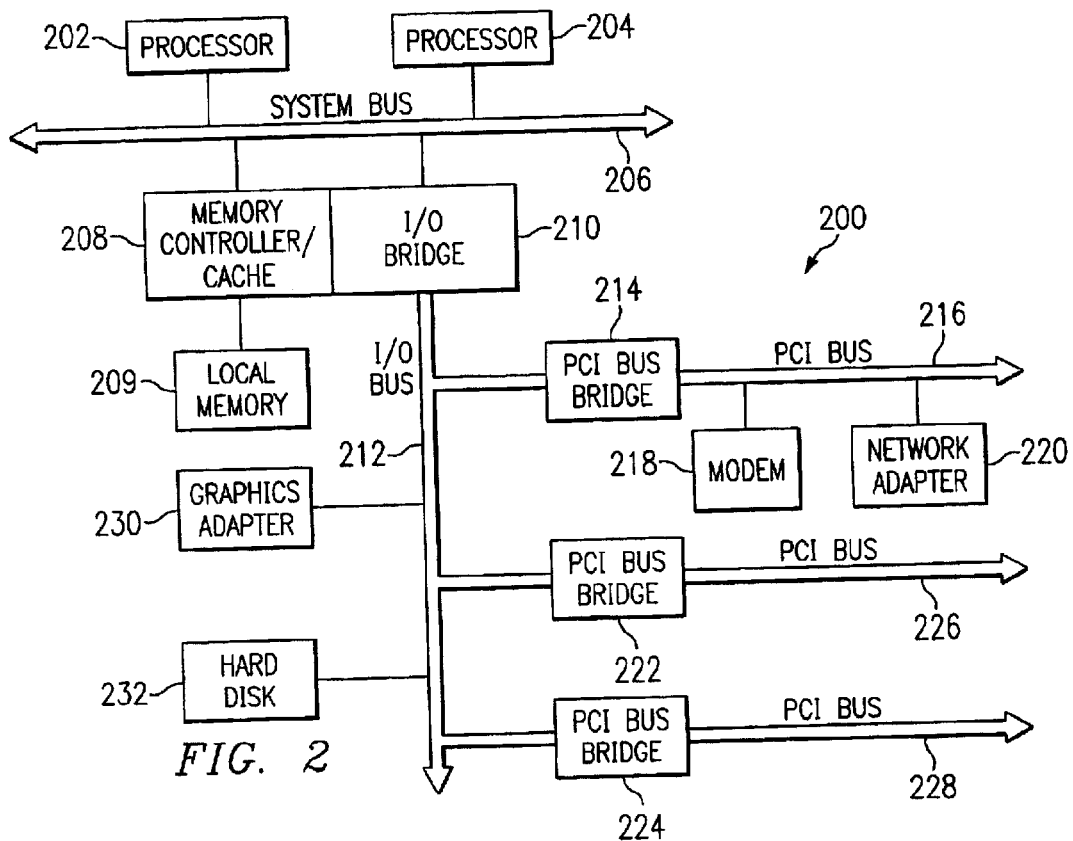
FIG. 2 is an illustration of a data processing system.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to clients 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
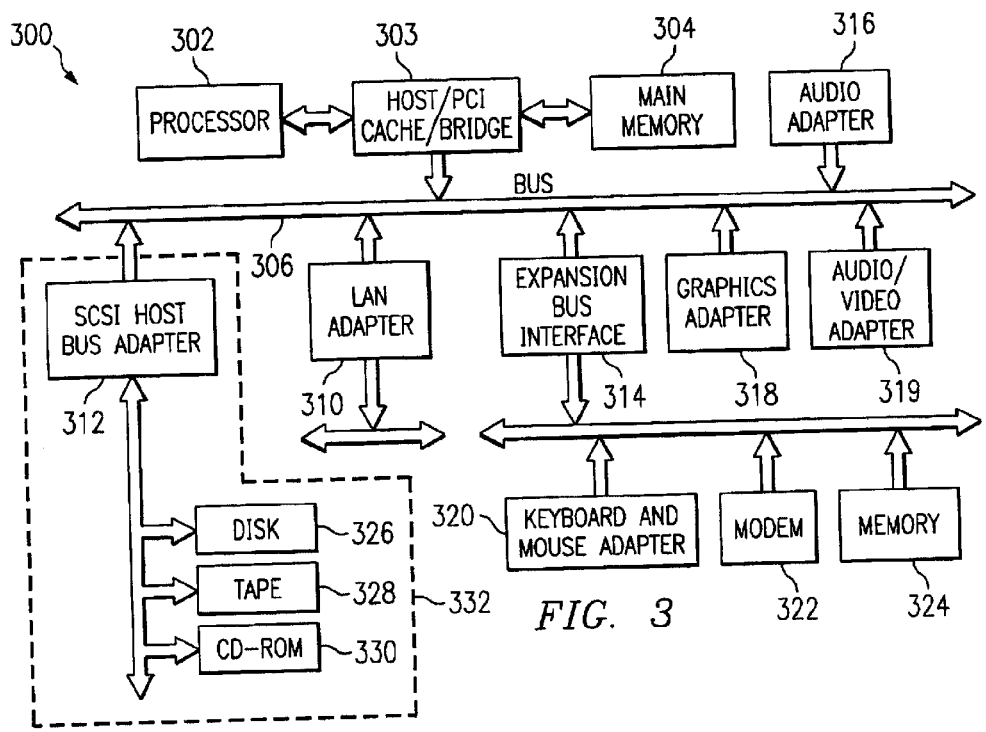
FIG. 3 is an illustration of a data processing system.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or student-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4A:
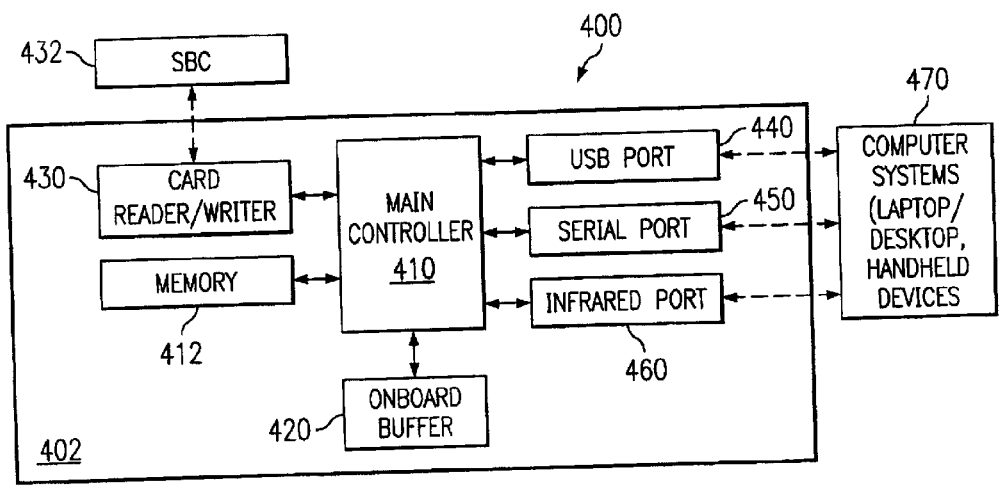
FIG. 4A depicts a Smart Business Card Read/Write.
Figure 4B:
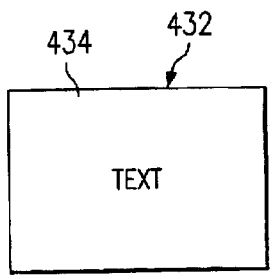
FIG. 4B depicts the first side of a Smart Business Card.
Figure 4C:
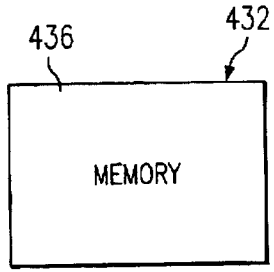
FIG. 4C depicts the second side of a Smart Business Card.
Figure 4D:
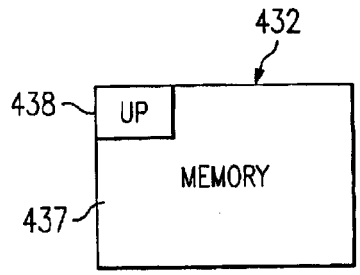
FIG. 4D depicts an alternative embodiment of the second side of a Smart Business Card.

FIG. 4A depicts Smart Business Card System (SBCS) 400. SBCS 400 has Smart Business Card (SBC), Smart Business Card Read/Write (SBCR/W) 402 and Computer 470. SBCR/W 402 has card reader/writer 430, onboard buffer 420, and optional memory 412 connected to main controller 410. Main controller 410 is connected to one or more of the following: USB port 440, serial port 450 and infrared port 460. Computer 470 is connected to SBCR/W by one or more of USB port 440, serial port 450 and infrared port 460. Computer 470 may be any data processing system including without limitation a laptop, a desktop, a handheld device and systems as depicted in FIGS. 1 through 3. FIG. 4B depicts first side 434 of SBC 432 which contains printed text such as would appear on a traditional business card. FIG. 4C depicts second side 436 of SBC 432 which is devoted entirely to magnetic media memory. The space assigned to magnetic media memory on second side 436 is limited only by the design constraints for SBC 432. FIG. 4D depicts an alternative embodiment of second side 437 of SBC 432, similar to second side 436. Alterative embodiment of second side 437 is electrically coupled to microprocessor 438 which can process electronic data stored on the storage media on second side 437.

Figure 5:
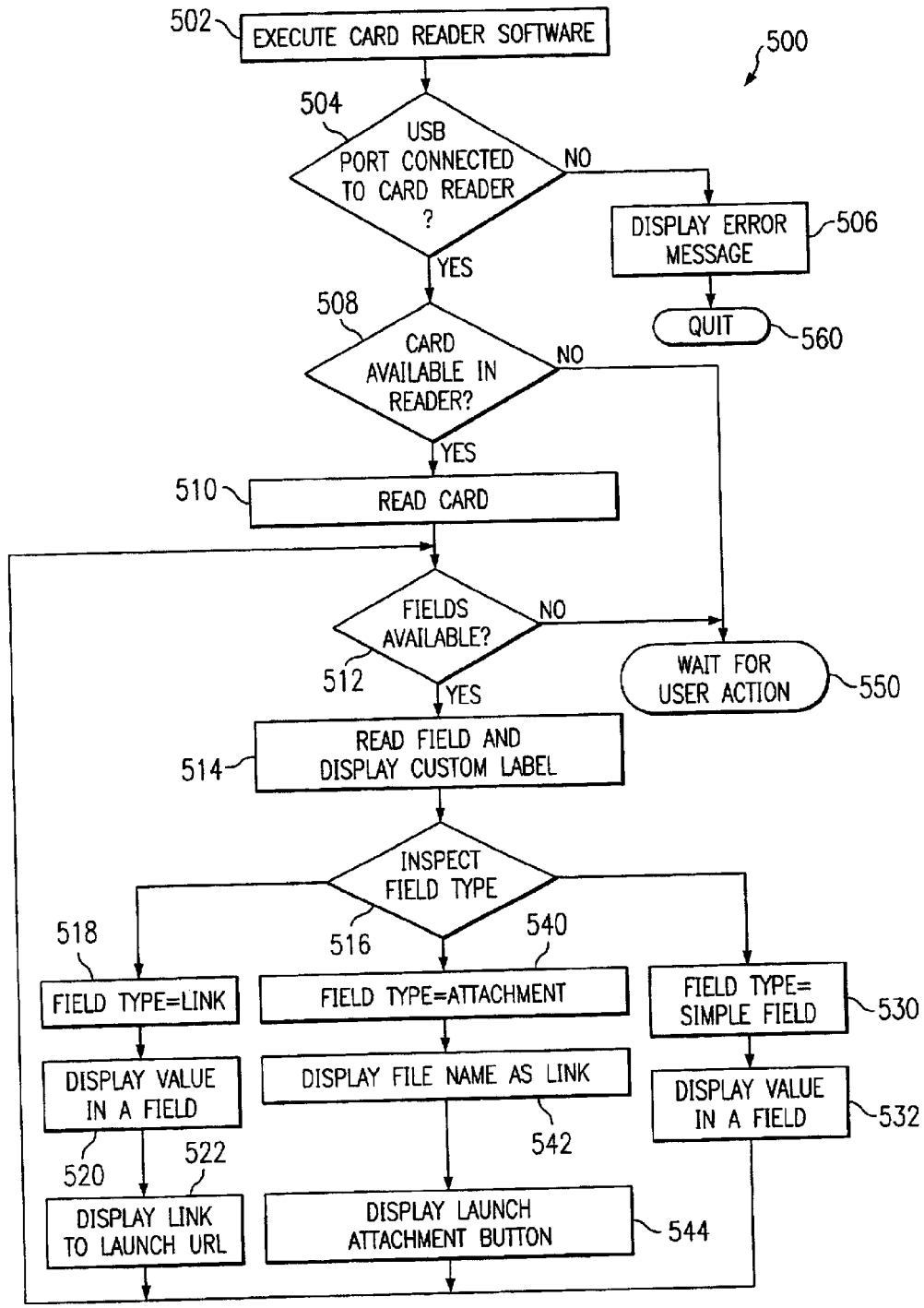
FIG. 5 is a flowchart of the Card-Reader Software Initialization Routine.

FIG. 5 depicts a flow chart of Software Initialization (SI) routine 500 which is located in the memory of computer 470. An instruction to execute SI 500 is input (502) to computer 470. SI 500 determines whether or not the USB port is connected to the card reader. (504). If USB port is not connected to the card reader, then an error message is displayed (506) and SI 500 ends (560). If the USB port is connected to the card reader, then SI 500 determines whether there is a card available in the card reader (508). If a card is not available in the card reader, then SI 500 waits for user action, i.e. placing a card in the card reader (550). If a card is available in the card reader, then SI 500 reads the card (510). A determination is made whether fields are available on the card (512). If fields are not available, SI 500 waits for user action, i.e., to place a card with available fields into the card reader (550). If fields are available, then SI 500 reads each available field and displays a custom label (514). SI 500 inspects the field type to determine whether the field type is a link type, a simple field type, or an attachment type (516). If a determination is made that the field type is a link type (518) a value is displayed in the field (520) and the link is displayed to launch a Uniform Resource Locator (URL) 522 and SI 500 returns to step 512. If a determination is made that the field type is a simple field type (530), a value is displayed for the field (532) and SI 500 returns to step 512. If a determination is made that the field type is an attachment type (540), the file name is displayed as a link (542), launch attachment buttons are displayed (544) and SI 500 returns to step 512.

FIG. 6 depicts default SBC Content Descriptor 600. SBC Content Descriptor 600 contains "name," "job title," "company," "worktelephone," "workaddress," "emailaddress," "hometelephone," "mobilenumber," and "pager." Persons skilled in the art will recognize that SBC Content Descriptor 600 may vary in the number and type of items provided as a content descriptor.

Figure 7:
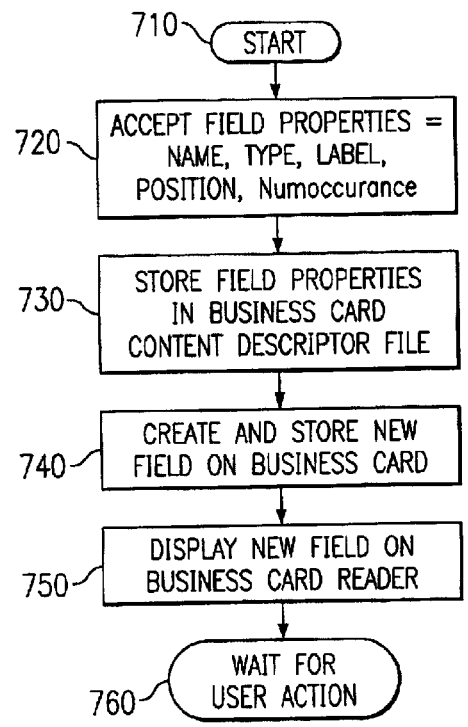
FIG. 7 depicts a flowchart for the Card-Reader New Field Creation routine.

FIG. 7 depicts a flow chart for one type of user action, implementing a New Field Creation (NFC) routine 700. NFC routine 700 begins (710) and accepts field properties (720). Examples of field properties are Name, Type, Label, Position, and Numoccurance. Next, the field properties are stored in an SBC content descriptor file (730). The user then creates a new field on the SBC and stores the new field (740). New fields are displayed on the SBC Reader (750). NFC routine 700 then waits for user action (760).

FIG. 8 depicts an SBC content descriptor in which the user has added two fields. Content descriptor 800 has all of the fields of content descriptor 600 and has first new field 810 added and second new field 820 added. First new field 810 is "alternatephone" and second new field 820 is "alternateaddress."

FIG. 9 depicts a flow chart for another type of user action, importing a Business Card Content Descriptor by first import routine 900. First import routine begins (910) and accepts a directory name and file name for importing a content descriptor (920). Next first import routine 900 reads the content descriptor from permanent storage (930). The content descriptor is displayed (940). A determination is made as to whether the existing content descriptor should be overwritten on the SBC (950). If not, first import routine 900 waits for user action (990). If the existing content descriptor is to be overwritten, then a determination is made as to whether existing data is to be mapped to the new content descriptor (960). If not, first import routine 900 waits for user action (990). If the existing data is to be mapped to the new content descriptor, then a mapping tool is displayed to map data to the new content descriptor (970) and first import routine 900 returns to step 960.

Figure 10:
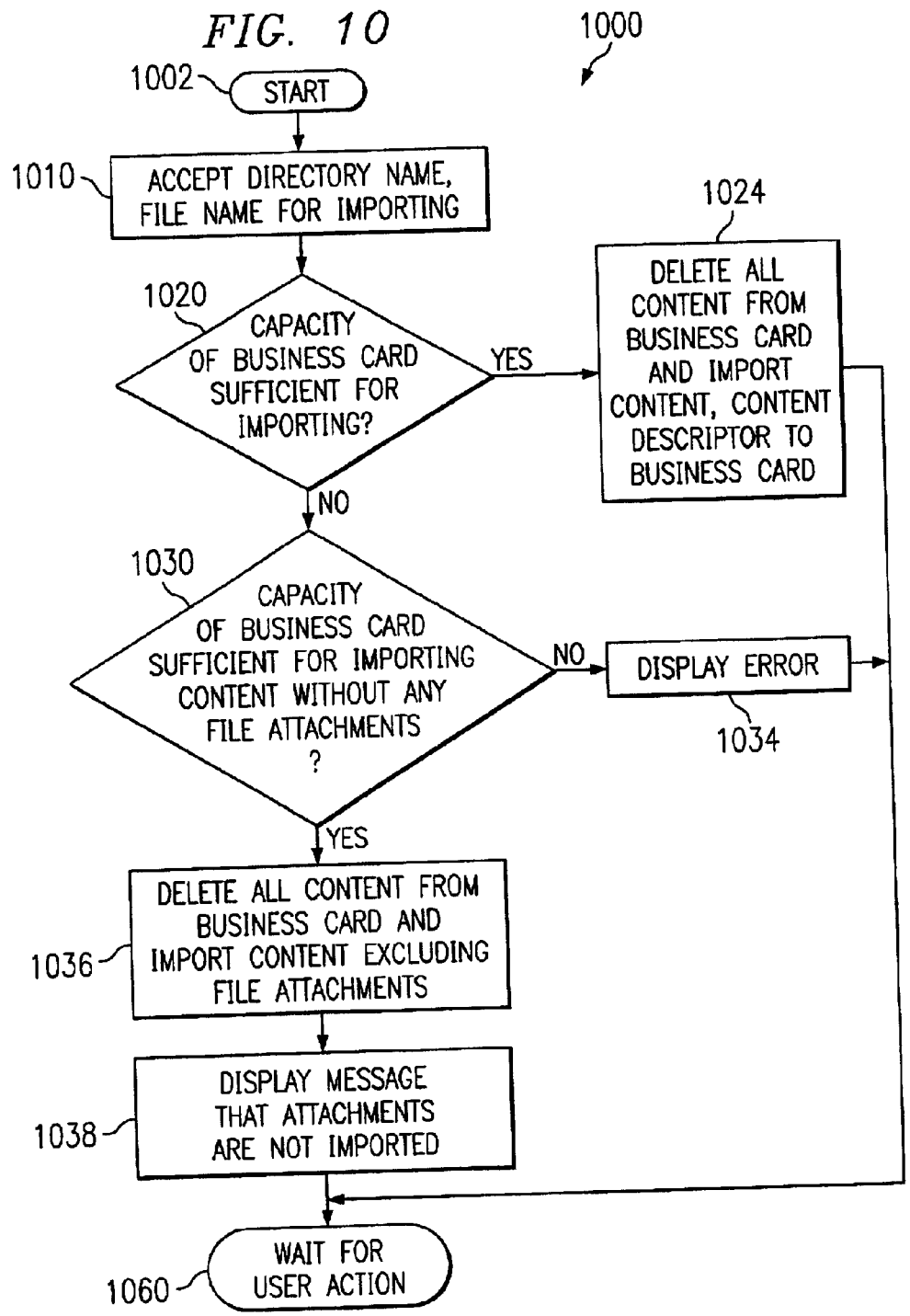
FIG. 10 depicts a flowchart for the file attachment routine.

FIG. 10 depicts flow chart for second import routine 1000 which is used to import the Business Card Content with the Content Descriptor. Second import routine 1000 begins (1002) and accepts the directory name and the file name for the files to be imported (1010). A determination is made as to whether the capacity of the SBC is sufficient for importing (1020). If the capacity is sufficient, all content is deleted from SBC and the new content and content descriptor is written into the SBC (1024). After importing the new content and content descriptor, second import routine 1000 waits for user action (1060). If the capacity of the SBC is not sufficient for importing, then a determination is made as to whether the capacity of the SBC is sufficient for importing content without any file attachments (1030). If not, an error message is displayed (1034) and second import routine (1000) waits for user action (1060). If the capacity is sufficient for importing without file attachments, then all content is deleted from the SBC and the content excluding file attachments is written to the SBC (1036). A message is displayed that attachments are not imported (1038) and second import routine 1000 waits for user action (1060).

Figure 11:
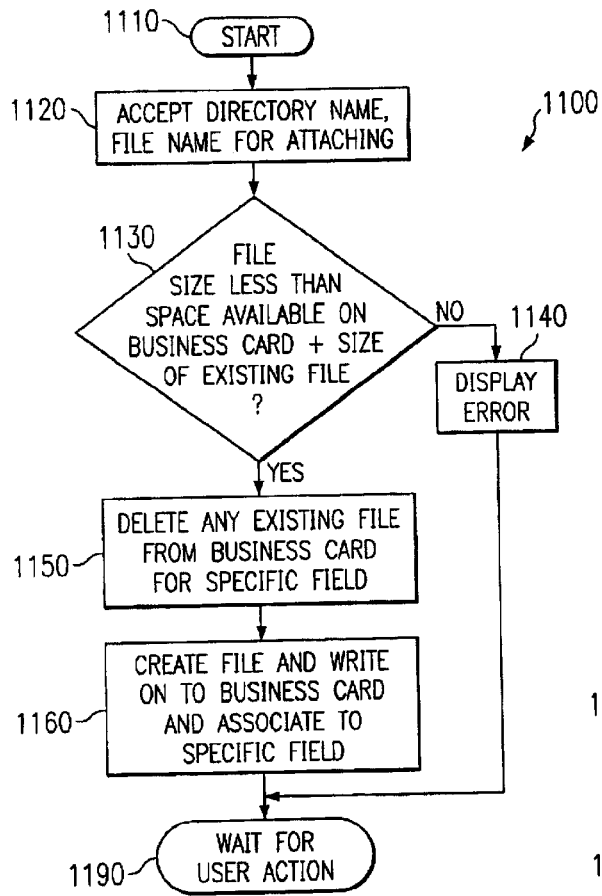
FIG. 11 depicts a flowchart for the Saving Files routine.

FIG. 11 depicts attachment routine 1100. Attachment routine 1100 starts (1110) and accepts the directory name and file name for the file to be attached (1120). A determination is made as to whether the file size is less than the space available on the business card plus the size of the exiting files (1130). If not, a error message is displayed (1140) and attachment routine 1100 waits for user action (1190). If the file size is less than the space available on the SBC plus the size of the existing file, then any existing file is deleted from SBC for the specific field (1150). Next a file is created and written on to SBD and associated with a specific field (1160). Attachment routine 1100 then waits for further user action (1190).

Figure 12:
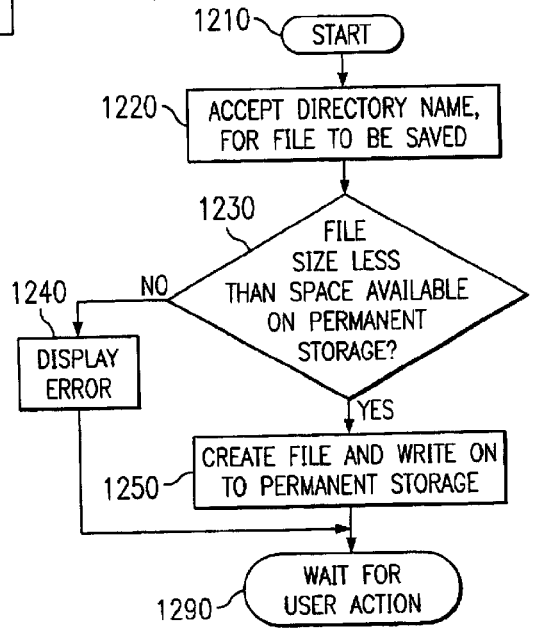
FIG. 12 depicts a flowchart for the Export routine.

FIG. 12 depicts the flow chart for Save routine 1200 for saving files from SBC to permanent storage. Save routine 1200 begins (1210) and accepts the directory name for the file to be saved (1220). A determination is made as to whether the file size is less than the space available on the permanent storage (1230). If the file size is not less than the space available on the permanent storage, then an error message is displayed (1240) and Save routine 1200 waits for user action (1290). If the file size is less than the space available, then Save routine 1200 creates a file and writes the file onto the permanent storage (1250). After writing the file onto the permanent storage, Save routine 1200 waits for user action (1290).

FIG. 13 depicts a flowchart for first export routine 1300 which is used to export a business card content descriptor to a computer. Export routine 1300 begins (1310) and accepts the directory name and the file name for saving content descriptor (1320). Next, the content descriptor is read from the SBC (1230). A content descriptor file is created in the permanent storage device (1340). Export routine 1300 waits for user action (1360).

FIG. 14 depicts a flow chart for second export routine 1400 used for exporting both business card content and the content descriptor. Second export routine 1400 begins (1410) and accepts the directory name and the file name for the files to be exported (1420). Next, second export routine 1400 reads the content and the content descriptor from the SBC (1430). Second export routine 1400 then creates file(s) and stores the content and the content descriptor file on the permanent storage device (1440). Second Export routine 1400 then waits for use action (1460).

FIG. 15 depicts a flow chart for the updating routine (1500) which is used to update information in other contact databases. Updating routine 1500 begins (1502) and reads information from SBC (1510). Next, updating routine 1500 accepts the contact database type (for example, Win CE, Palm O/S) (1520). A determination is made as to whether the target system will accept XML documents (1530). If the target system will not accept XML documents, the data is submitted to target system through target system's application programming interface (API) (1540). After submitting data to the target system through the target system's API, updating routine 1500 waits for user action (1590). If the target system will accept XML documents, then data is mapped to the target systems XML format (1560). The XML document is submitted to the target system through the target system's API (1570). Updating routine 1500 then waits for user action (1590).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method of transmitting a file from a Smart Business Card to a computer comprising;

inserting a Smart Business Card into a Smart Business Card Read/Write device, said Smart Business Card being rectangular in shape and sized substantially the same as a business card and said Smart Business Card comprising printed data and a storage media;

writing information comprising electronic data to said Smart Business Card using said Smart Business Card Read/Write device, said electronic data being stored within said storage media;

creating a content descriptor file on the Smart Business Card;

creating a content file on the Smart Business Card;

wherein the second side of the Smart Business Card is a magnetic media;

wherein when the Smart Business Card is inserted into the Smart Business Card Read/Write device, the first descriptor file and the first content file can be exported to a computer; and wherein said electronic data is substantially similar to said printed data.

2. The method of claim 1 further comprising: executing a software initialization routine.

3. The method of claim 1 further comprising: executing a new field creation routine.

4. The method of claim 1 further comprising: executing a first import routine.

5. The method of claim 1 further comprising: executing a save routine.

6. The method of claim 1 further comprising: executing a second import routine.

7. The method of claim 1 further comprising: executing a first export routine.

8. The method of claim 1 further comprising: executing a second export routine.

9. The method of claim 1 further comprising: executing an updating routine.

10. The method of claim 1 wherein said information is in an XML format.

11. The method of claim 1 wherein said printed data is on a first side of said Smart Business Card and said information is on a second side of said Smart Business Card.

12. The method of claim 1 wherein said information further comprises an electronic file attached to said electronic data.

13. The method of claim 1 wherein said information further comprises a hyperlink attached to said electronic data, said hyperlink launching a web browser and directing a user to a website.

14. An apparatus for transmitting electronic files between a Smart Business Card and a computer comprising:
   a Smart Business Card comprising printed data and electronic data stored on a storage media;
   wherein said Smart Business Card is rectangular in shape and sized substantially the same as a traditional business card;
   a Smart Business Card Read/Write device electrically coupled to a computer, said Smart Business Card Read/Write device reading said electronic data on said Smart Business Card;
   software located in a memory of said computer;
   said computer being directed by said software to perform steps comprising:
      creating a first content descriptor file on said Smart Business Card;
      creating a first content file on said Smart Business Card;
   wherein said second side is a magnetic media; and
   wherein when said Smart Business Card is inserted into said Smart Business Card Read/Write device, the first content descriptor file and the first content file can be exported to the computer.

15. The apparatus of claim 14 further comprising: wherein when said Smart Business Card is inserted into said Smart Business Card Read/Write device, a second content descriptor file and a second content file can be imported from the computer to the Smart Business Card.

16. The apparatus of claim 14 wherein said printed data is on a first side of said Smart Business Card and said electronic data is on a second side of said Smart Business Card.

17. The apparatus of claim 14 wherein said electronic data further comprises an electronic file attached to said electronic data.

18. The apparatus of claim 14 wherein said electronic data further comprises a hyperlink attached to said electronic data, said hyperlink launching a web browser and directing a user to a website.

19. A system for transmitting electronic files in XML format comprising:
   a Smart Business Card having printed data and electronic data;
   wherein said Smart Business Card is rectangular in shape and sized substantially the same as a traditional business card;
   wherein said electronic data comprises a content descriptor file and a content file;
   a Smart Business Card Read/Write device receiving said Smart Business Card;
   a computer in communication with said Smart Business Card Read/Write device;
   software located in a memory of said computer;
   wherein said software directs said computer to utilize said Smart Business Card Read/Write device to read said electronic information from said Smart Business Card;
   wherein said software directs a computer to create the content descriptor file on the Smart Business Card;
   wherein said software directs said computer to create the content file on the Smart Business Card;
   wherein the second side of the Smart Business Card is a magnetic media;
   wherein when the Smart Business Card is inserted into the Smart Business Card Read/Write device, the content descriptor file and the content file can be exported to the computer; and
   wherein, upon said Smart Business Card Read/Write device reading said Smart Business Card, said electronic information is copied to a record in a database in said computer.

20. The system of claim 19 wherein said computer is directed by said software to perform the step of, responsive to the Smart Business Card being inserted into a Smart Business Card Read/Write device, creating a new field.

21. The system of claim 19 wherein said computer is directed by said software to perform the step of, responsive to the Smart Business Card being inserted into a Smart Business Card Read/Write device, importing a content descriptor file.

22. The system of claim 19 wherein said computer is directed by said software to perform the step of, responsive to the Smart Business Card being inserted into a Smart Business Card Read/Write device, importing a content file.

23. The system of claim 19 wherein said computer is directed by said software to perform the step of, responsive to the Smart Business Card being inserted into a Smart Business Card Read/Write device, saving a file.

24. The system of claim 19 wherein said computer is directed by said software to perform the step of, responsive to the Smart Business Card being inserted into a Smart Business Card Read/Write device, importing a file.

25. The system of claim 19 wherein said computer is directed by said software to perform the step of, responsive to the Smart Business Card being inserted into a Smart Business Card Read/Write device, exporting a file.

26. The system of claim 19 wherein said computer is directed by said software to perform the step of, responsive to the Smart Business Card being inserted into a Smart Business Card Read/Write device, updating a file.

27. The system of claim 19 wherein said printed data is on a first side of said Smart Business Card and said electronic data is on a second side of said Smart Business Card.

28. The system of claim 19 wherein said electronic data further comprises an electronic file attached to said electronic data.

29. The system of claim 19 wherein said electronic data further comprises a hyperlink attached to said electronic data, said hyperlink launching a web browser and directing a user to a website.

30. An apparatus for transmitting electronic files between a Smart Business Card and a computer:
   a Smart Business Card comprising printed data and electronic data stored on a storage media;
   wherein said Smart Business Card is rectangular in shape and sized substantially the same as a traditional business card;
   a Smart Business Card Read/Write device;
   means for connecting said Smart Business Card Read/Write device to said computer;
   means for creating a content descriptor file on the Smart Business Card;
   means for creating a content file on the Smart Business Card;

wherein the second side of the Smart Business Card is a magnetic media; and wherein when the Smart Business Card is inserted into the Smart Business Card Read/Write device, the first descriptor file and the first content file can be exported to a computer.

31. The apparatus of claim 30 further comprising: means for creating a new field.

32. The apparatus of claim 30 further comprising: means for saving a file.

33. The apparatus of claim 30 further comprising: means for importing a file.

34. The apparatus of claim 30 further comprising: means for exporting a file.

35. The apparatus of claim 30 further comprising: means for updating a file.

36. The apparatus of claim 30 wherein said printed data is on a first side of said Smart Business Card and said electronic data is an a second side of said Smart Business Card.

37. The apparatus of claim 30 wherein said electronic data further comprises an electronic file attached to said electronic data.

38. The apparatus of claim 30 wherein said electronic data further comprises a hyperlink attached to said electronic data, said hyperlink launching a web browser and directing a user to a website.

* * * * *

UNITED STATES PATENT AND TRADEMARK OFFICE
CERTIFICATE OF CORRECTION

PATENT NO. : 6,783,060 B2
DATED : September 16, 2004
INVENTOR(S) : Marappan

It is certified that error appears in the above-identified patent and that said Letters Patent is hereby corrected as shown below:

Column 1,
Line 42, "of" should be -- of: --
Line 48, "business is" should be -- a business card is --

Column 7,
Line 51, "(SBC)" should be -- (SBC) 432, --
Line 51, "(1230)" should be -- (1330) --

Signed and Sealed this

Fourteenth Day of December, 2004

JON W. DUDAS
*Director of the United States Patent and Trademark Office*